US007219335B1

(12) United States Patent  (10) Patent No.: US 7,219,335 B1
Moas et al.                 (45) Date of Patent:     May 15, 2007

(54) METHOD AND APPARATUS FOR STACK EMULATION DURING BINARY TRANSLATION

(75) Inventors: Gal Moas, K Byalik (IL); Orna Etzion, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/458,121

(22) Filed: Dec. 8, 1999

(51) Int. Cl.
 G06F 9/44 (2006.01)
(52) U.S. Cl. ..................................... 717/134
(58) Field of Classification Search ............... 717/138, 717/150–158, 130, 126, 154, 159, 134; 395/708; 395/500; 712/216–219; 714/50; 711/144
 See application file for complete search history.

(56) References Cited

U.S. PATENT DOCUMENTS

| | | | | |
|---|---|---|---|---|
| 5,301,325 A | * | 4/1994 | Benson | 717/159 |
| 5,577,233 A | | 11/1996 | Goettelmann et al. | |
| 5,627,998 A | * | 5/1997 | Mondrik et al. | 710/62 |
| 5,633,998 A | * | 5/1997 | Schlafly | 714/1 |
| 5,668,999 A | * | 9/1997 | Gosling | 717/126 |
| 5,740,441 A | * | 4/1998 | Yellin et al. | 717/134 |
| 5,790,778 A | * | 8/1998 | Bush et al. | 714/38 |
| 5,835,958 A | * | 11/1998 | Long et al. | 711/170 |
| 5,930,509 A | * | 7/1999 | Yates et al. | 717/159 |
| 6,091,897 A | * | 7/2000 | Yates et al. | 717/138 |
| 6,125,439 A | * | 9/2000 | Tremblay et al. | 712/202 |
| 6,134,573 A | | 10/2000 | Henry et al. | |
| 6,314,558 B1 | * | 11/2001 | Angel et al. | 717/118 |
| 6,725,361 B1 | | 4/2004 | Rozas et al. | |

OTHER PUBLICATIONS

Flyn, Michael J., Computer Architecture, Pipelined and Parallel Processor Design, 1995, Jones and Bartlett Publishers, p. 492.

* cited by examiner

*Primary Examiner*—Tuan Anh Vu
(74) *Attorney, Agent, or Firm*—Blakely, Sokoloff, Taylor & Zafman LLP

(57) ABSTRACT

A method of monitoring processor resources. To monitor a processor resource, first a set of needed resources is determined at the beginning of a block of code. A test is then performed to determine if the set of needed resources is available at the start of the block of code. An error is signaled if the needed resources are not available at the beginning of the block of code.

14 Claims, 3 Drawing Sheets

METHOD AND APPARATUS FOR STACK EMULATION DURING BINARY TRANSLATION

FIELD OF THE INVENTION

The present invention relates to the field of computer emulation. In particular the present invention discloses methods for emulating a computer processor architectural stack.

BACKGROUND OF THE INVENTION

As new computer processors are designed, new computer architectural designs are created. The new computer architecture designs improve the processing performance of the new computer processors. However, the existing set of computer programs often can not directly execute on new computer architectures.

To run computer object code written for an older computer architecture on a newer computer processor, many computer systems use software that will "emulate" the older computer processor architecture. Specifically, software running on the newer computer processors simulates the actions of the older computer processor by interpreting each instruction. Software emulators work well for executing many legacy applications. However, software emulation wastes processor power due to the emulation software overhead.

Another method of running computer object code written for an older computer architecture on a new computer processor is to perform binary translation. A binary translator translates blocks of code written for an older source architecture into equivalent blocks of code in the newer target processor architecture. The translation can be done "on the fly" (while "executing" the older source architecture code). Translation could also be done before execution. By translating the old source architecture code into code for the newer processor architecture, the overhead of the emulation code is eliminated. Thus, binary translation often provides better performance than emulation.

When executing older code, both software emulation systems and binary translators must precisely duplicate the environment of the older processor architecture. Software emulators duplicate the behavior of the older processor architecture by providing an interpreter that interprets each microprocessor instruction as the original processor would have. Binary translators provide a duplicate environment by inserting extra instructions as necessary to ensure that various parameter limits of the older processor are not being exceeded. Since the extra instructions are not directly related to the goal of the original program, these extra instructions are "overhead" code that reduce performance. It would be desirable to implement binary translators in a manner that minimizes the amount of overhead code that needs to be added to duplicate the environment of the older processor architecture.

SUMMARY OF THE INVENTION

A method and apparatus for monitoring processor resources is disclosed. To monitor a processor resource, first a set of needed resources is determined at the beginning of a block of code. A test is then performed to determine if the set of needed resources is available at the start of the block of code. An error is signaled if the needed resources are not available at the beginning of the block of code.

DETAILED DESCRIPTION OF THE PREFERRED EMBODIMENT

A method and apparatus for emulating a computer processor architectural stack is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the INTEL architecture floating point stack. However, the same techniques can easily be applied to other types of stacks in other computer processors.

As previously set forth, legacy applications that were written for an older processor architecture can be run on a new processor architecture by using an emulator or a binary translator. With either solution, a significant amount of "overhead" code must be added to have the new processor architecture simulate the actions of the older processor architecture.

Processor exceptions are one specific aspect of an older processor architecture that must be duplicated. If a resource limit of the older processor architecture is exceeded in a manner that would cause an exception, for example a stack over flows, then an appropriate processor exception is to be generated. In order to generate exceptions at appropriate times, the overhead code keeps track of processor resources to monitor whether the older processor architecture limits have not been exceeded.

To illustrate how prior art software emulators and binary translator systems handle exceptions, an example is provided. The following example illustrates the traditional approach for validating stack limitations. The following code lists a short program for 32-bit INTEL architecture processors.

| Code Listing 1: Example Source Processor Code | |
| --- | --- |
| FLD <mem> | ;Push a value onto the floating point stack |
| FSTP <dest1> | ;Pop a value off of the floating point stack |
| FSTP <dest2> | ;Pop a value off of the floating point stack |

The first line of the 32-bit INTEL architecture pushes a floating point value from a memory location <mem> onto the processor's floating point stack. The second line of code pops a value off the processor's floating point stack and puts the value into a destination memory location <dest1>. The third line of code pops a value off the processor's floating point stack and puts the value into a destination memory location <dest2>.

Figure 1:
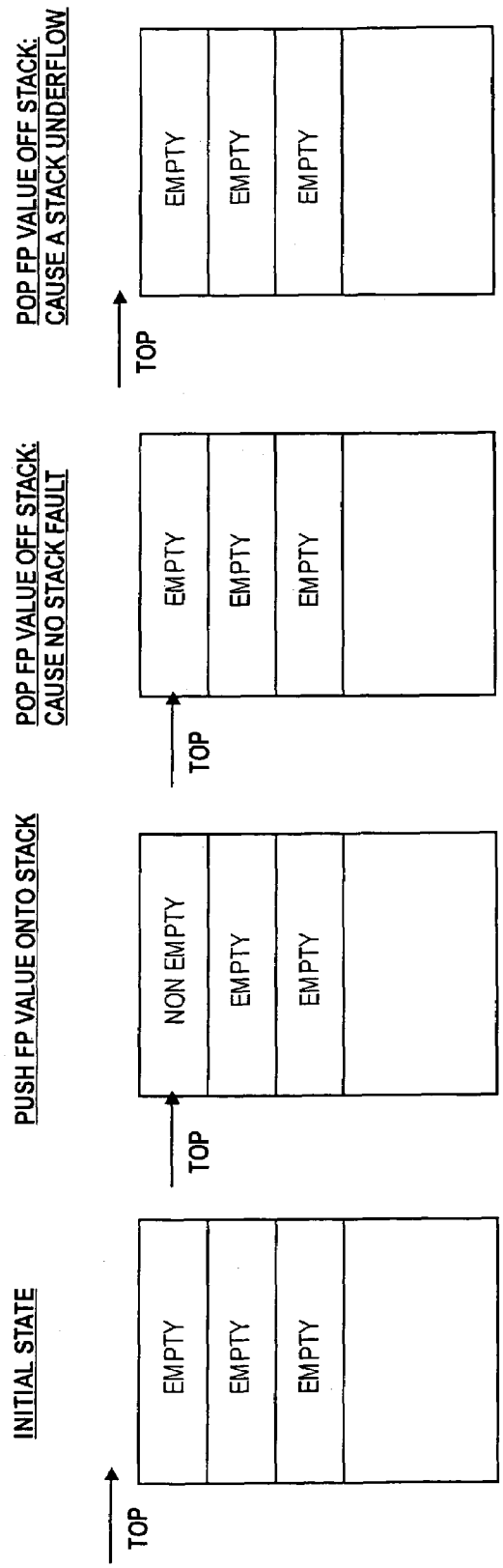
FIG. 1A conceptually illustrates one possible initial state of a processor stack.
FIG. 1B conceptually illustrates the state of a processor stack after starting from the initial processor stack state of FIG. 1A and executing the first instruction of code listing 1.
FIG. 1C conceptually illustrates the state of a processor stack after starting from the processor stack state of FIG. 1B and executing the second instruction of code listing 1.
FIG. 1D conceptually illustrates the state of a processor stack after starting from the processor stack state of FIG. 1C and executing the third instruction of code listing 1.

FIGS. 1A to 1D conceptually illustrate how the above example would cause an exception when run in a processor that has an empty stack. FIG. 1A conceptually illustrates an initial state with an empty floating point stack. FIG. 1B conceptually illustrates how the floating point stack appears after the FLD <mem> instruction executes and places a value onto the floating point stack. FIG. 1C conceptually illustrates how the floating point stack appears after the FSTP <dest1> instruction executes and pops the value off the floating point stack. Finally, FIG. 1D conceptually illustrates why the final instruction conceptually illustrates why the instruction FSTP <dest2> causes an exception when it executes. Specifically, an underflow exception occurs since the FSTP <dest2> instruction attempts to pop a value off an empty floating point stack.

To detect such stack underflows, prior art systems typically add overhead code that keeps track of the floating point stack state. At each instruction that affects the floating point stack, the overhead code checks to ensure that no overflow or underflow has occurred. Specifically, the binary translator creates a stack check sequence for each stack operation. The following example code presents code that might be created by a prior art binary translator:

---
Code Listing 2: Prior Art Binary Translator code:
---

```
Add top = top − 1           ;decrement stack top (Push)
CMP stack[top] == empty     ;validate stack top to be empty
BRNE FaultHandler           ;Else - go to fault handler function
FLD stack[top]= <mem>       ;Load to stack top
CMP stack[top] == non empty ;validate stack top to be non empty
BRNE FaultHandler           ;Else - go to fault handler function
FLD <dest1> = stack[top]    ;store from stack top
ADD top = top + 1           ;Increment stack top (pop)
CMP stack[top] == non empty ;validate stack top to be non empty
BRNE FaultHandler           ;Else - go to fault handler function
FLD <dest2> = stack[top]    ;store from stack top
ADD top = top + 1           ;Increment stack top (pop)
```

In the prior art binary translator code, a "top" variable maintains a stack top pointer and a "stack" array maintains the contents of the stack. The first four lines simulate the FLD <mem> instruction of the original code. Two instructions (the Compare "CMP" and Branch If Not Equal "BRNE" instructions) ensure that the stack contains an empty position before the push onto the floating point stack occurs. If the stack pointer does not point to an empty stack position, then the program will branch to a fault handler routine labeled "FaultHandler".

The next four lines of the prior art binary translator code simulate the first "FSTP" instruction that pops a value off the floating point stack and stores that value into a defined location. The code first ensures that the floating-point stack position at the top of the stack is not empty. After this has been verified, the pop is emulated by storing the value at the top of the floating-point stack into the defined <dest1> memory location. Similarly, the last four lines of code simulate the final "FSTP" instruction that pops a value off the floating point stack and stores that value into a defined location.

As illustrated above, the overhead code that keeps track of resources can significantly enlarge the original code. In the above example, the original three lines of code expanded into twelve lines of code. The extra instructions can significantly degrade the software performance.

Improved Resource Monitoring for Emulation and Binary Translation

To improve the performance of emulators and binary translators, the present invention introduces an improved method of Monitoring processor resources. In one embodiment, a short set of instructions at the beginning of a block of code checks to determine if needed processor resources are available at the beginning of a block of code. If the needed resources are available, then execution proceeds. The code then modifies the set of available resources according to the resource requirements of the instructions in the block of code.

By performing a check at the start of a block of code rather than at each instruction addressing the stack, the system of the present invention can provide a significant performance advantage. The check is performed in the block header and thus saves cycles and code size. Furthermore, numerous branches to the fault handling function are removed. Removing branch instructions can significantly improve performance since mispredicted branches may cause processor stalls. Finally, the improved code is easier to schedule.

In one embodiment of the present invention, a register is used to keep track of the stack contents. Specifically, in one embodiment, a set of bits in a designated register are associated with the available stack entries. If a particular bit is clear then the associated stack entry is empty. Similarly, if a particular bit is set then the associated stack entry is non-empty. To verify that the stack contains the needed resources, a needed stack state is compared with the current stack state representation. If the current stack state does not match the needed stack state then a processor exception may be generated.

To illustrate the teachings of the present invention, an example is hereby provided with reference to the previous provided sample code of Code Listing 1. The following example code uses an array named "stack" that contains the contents of the simulated floating-point stack. The example code uses a "top" variable as a stack pointer into the "stack" array. Finally, the example uses a binary status representation of stack entries known as the <stack register> that contains the status (non-empty or empty) of each stack entry. Specifically, in one embodiment, a set bit in the <stack register> indicates an associated non-empty stack entry and a clear bit indicates an associated empty stack entry. Note that the following example assumes that the stack pointer is pointing to the top of the stack (the leftmost position in the stack status register). In alternative embodiments, the stack pointer may point to the right most position.

---
Code Listing 3: Improved Translated Code
---

```
; Check sequence that tests the stack
AND <tmp register> = <stack register>, <11000 . . . 0>
    ;Extract the relevant stack bits (in the example - the first 2 bits)
CMP < tmp register> == <10000 . . . 0>
    ;Compare to needed stack (1st entry non empty, 2nd entry empty)
BRNE FaultHandler          ;Else - go to fault handler function
;Actual code emulation
ADD top = top − 1          Decrement stack top (push)
FLD stack[top] = <mem>     Load to stack top
```

Code Listing 3: Improved Translated Code

```
FLD <dest1> = stack[top]         Store to <dest1> from stack top
ADD top = top + 1                Increment stack top (pop)
FLD <dest2> = stack[top]         Store to <dest2> from stack top
ADD top = top + 1                Increment stack top (pop)
;Update the stack register
XOR <stack register> = <10000 . . . 0>, <stack register>
    ;Reset mask (clear first bit).
```

The example code has been divided into three sections: a check sequence, an emulation sequence, and an update sequence. The check sequence determines if the required resources are available. The emulation code sequence performs the intended operation of the source code. The update sequence updates the resource Monitoring variables.

Figure 2:
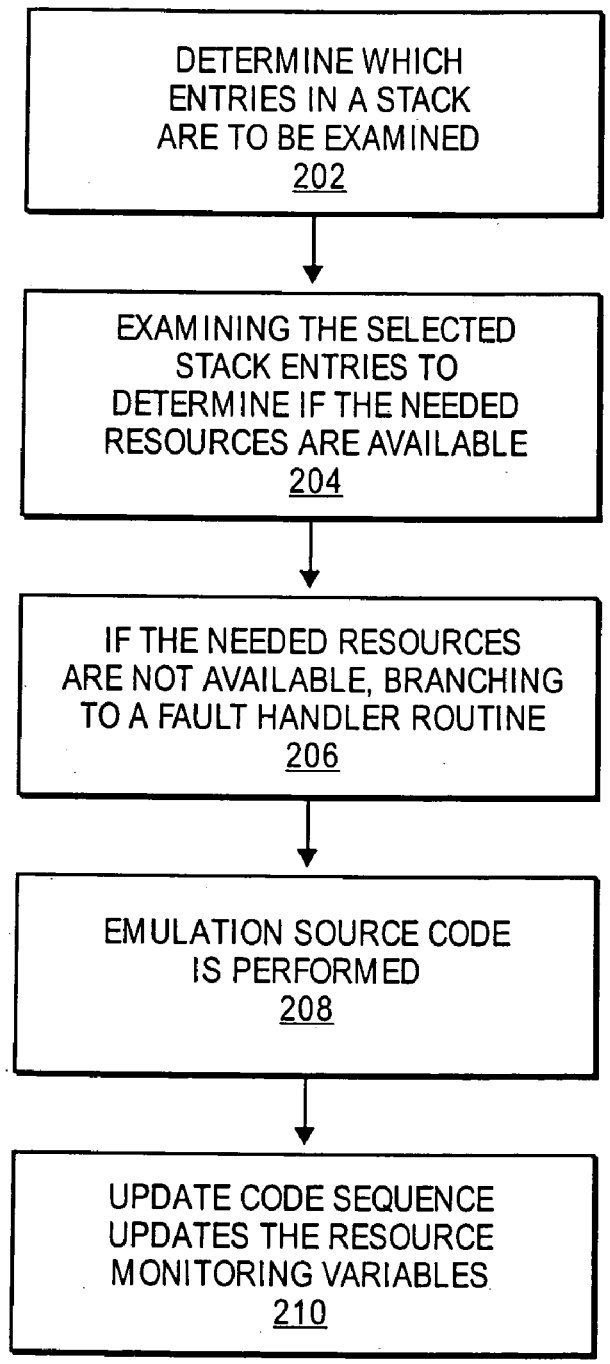
FIG. 2 is a flow diagram describing the steps of monitoring the processor resources according to one embodiment.

FIG. 2 is a flow diagram describing the steps of monitoring processor resources as set forth in the code listing 3. In processing block 202, the first instruction (the "AND" instruction) logically ANDs the stack register with a value that specifies the relevant bits. In the example source code (code listing 1), one push and two pops are performed. Thus, the two positions a near the top of the stack should be examined. The AND operation reflects this by masking off all bits of the stack status register except for the first two bits (the two entries associated with the top of the stack) and placing the result in a temporary register.

In processing block 204, a compare ("CMP") operation compares the temporary register value with the needed stack values. Since a push followed by two pops will be performed, the stack needs an empty position just "above" the top of the stack and a non-empty entry at the top of the stack (to fulfill the second pop). This is represented by the bit vector <10000 . . . 0> where the first set bit is the non empty position at the top of the stack. The adjacent clear bit is the empty position just above the top of the stack. Note that the other positions are set to zero such that the comparison is not affected by these positions that were masked off from the stack status register value. In alternative embodiments, the bit vector in the temporary register could bit positions cleared rather than set to indicate a non empty position without departing from the present invention.

In processing block 206, if the comparison does not detect a match, then the branch-if-not-equal ("BRNE") instruction will branch to a fault hander routine. The fault handler routine handles the lack of required resources appropriately. In one embodiment, the fault handler routine simulates an appropriate processor exception. For example, a stack overflow exception may be simulated.

After the check sequence has indicated that the needed stack resources are available, in processing block 208 the emulation code begins. The emulation code simulates the push, pop, and pop by using a "top" variable that contains a stack top pointer and a "stack" array that contains the contents of the stack.

After the emulation code, in processing block 210 an update code sequence updates the resource Monitoring variables. In this example, an exclusive-OR ("XOR") instruction updates the stack status register by performing an XOR operation with mask that has a 1 set for every stack location whose status has changed.

As illustrated in the example code of code listing 3, bit vector constants may be used when the value of the stack pointer is known. However, the system can be generalized in order to handle dynamic situations. To generalize the resource testing system, a method for generating the mask bit vector, the need comparison bit vector and the update bit vector is described. The bit vector creation method examines the code block that needs bit vectors and generates a MASK bit vector for masking off irrelevant bits and a NEEDED bit vector defining a needed state for comparison against the current stack state.

The bit vector creation method operates by creating two intermediate arrays. The first array is the 'EXPECTED mask', representing the expected stack status when entering a code block. The second arrays is the 'CURRENT mask', representing the current state of the stack as the method proceeds through the code block. Each array contains an entry for each stack location. Each stack location entry can be of type EMPTY, VALID, or UNKNOWN. The following psuedocode provides one method of dynamically generating the bit vectors for resource Monitoring.

Code Listing 4: The Mask Creation code

```
Initialize all CURRENT array entries to UNKNOWN.
Initialize all EXPECTED array entries to UNKNOWN.
For each instruction in code block:
{
    if the instruction is a Read stack entry X then
    {
        if CURRENT(X) != VALID then
        {
            EXPECTED(X) = VALID
            CURRENT(X) = VALID
        }
    }
    if the instruction is a Push (write) to stack entry X then
    {
        if CURRENT(X) != EMPTY then
        {
            EXPECTED(X) = EMPTY
        }
        CURRENT(X) = VALID
    }
    if the instruction is a Free (as a part of a pop) stack entry X
    then
    {
        if CURRENT(X) == VALID then
            CURRENT(X) = EMPTY
        else if CURRENT(X) == UNKNOWN then
        {
            CURRENT(X) = EMPTY
            EXPECTED(X) = VALID
        }
    }
}
Initialize all NEEDED bit vector bits to ZERO.
Initialize all UPDATE bit vectors bits to ZERO
Initialize all MASK bit vector bits to one
For each entry N in stack:
{
    if EXPECTED(N)==VALID then NEEDED(N)=one
    if EXPECTED(N) ==UNKOWN then MASK(N) = zero
    if EXPECTED(N)!= CURRENT(N) then UPDATE(N) = one
}
```

It should be noted that the pseudo code of code listing 4 has been generalized for a stack structure that allows stack operations other than just push and pop.

As set forth in code listing four, an EXPECTED array is generated by setting entries that are initially written to as EMPTY and entries that are initially read from as VALID. The NEEDED bit vector is generated by placing a one in for each VALID entry in the EXPECTED array, all other bits are set to zero. The MASK bit vector is generated by setting each bit having an EMPTY or VALID state in the CURRENT array. The UPDATE bit vector is generated by setting each bit where the CURRENT array does not equal the EXPECTED array.

The foregoing has described a method and apparatus for monitoring a computer processor architectural stack. It is contemplated that changes and modifications may be made by one of ordinary skill in the art, to the materials, arrangements, and code listings of the present invention without departing from the scope of the invention. For example, throughout the description where bit vectors have been described as having selected bit positions set or clear, in alternative embodiments, whether a selected bit position is set or clear, could be reversed without departing from the scope of the invention.

Figure 3:
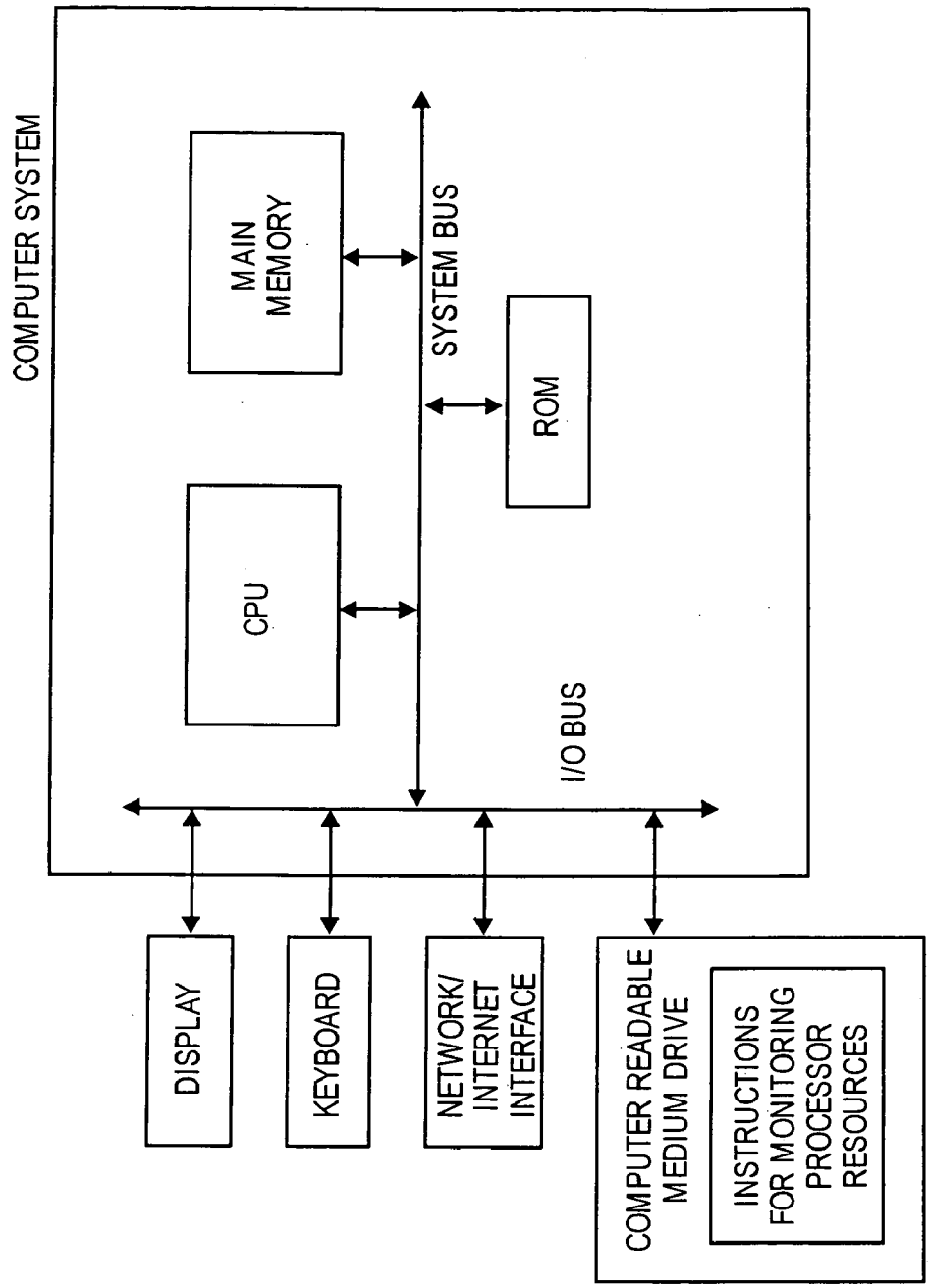
FIG. 3 illustrates a computer system having a computer readable medium with instructions stored thereon according to one embodiment of the present invention.

In addition, the methods as described above, including the methods of monitoring the processor resources, can be stored in memory of a computer system as a set of instructions to be executed. In addition, the instructions to perform the methods as described above could alternatively be stored on other forms of computer-readable medium, including magnetic and optical disks. For example, method of the present invention can be stored on computer-readable mediums, such as magnetic disks or optical disks, that are accessible via a disk drive (or computer-readable medium drive), such as the disk drive shown in FIG. 3.

Alternatively, the logic to perform the methods as discussed above, including the methods of monitoring the processor resources, could be implemented in discrete hardware components such as large-scale integrated circuits (LSI's), application-specific integrated circuits (ASIC's) or in firmware such as electrically erasable programmable read-only memory (EEPROM's). Furthermore, in one embodiment, the methods as described above, including the methods of monitoring the processor resources, are included as instructions and/or logic of an processor architecture emulator or binary translator.

Moreover, the methods as described above, including the methods of monitoring the processor resources, in one embodiment, could be performed when compiling source code in prior to executing the source code. Alternatively, the methods could also be performed dynamically as the source code is being executed.

We claim:

1. A method comprising:
    inserting a single instruction at the block header of a block of code configured for execution on a first processor architecture, wherein the single instruction is to determine if resources needed for the first processor to execute the block of code are available;
    emulating the block of code on a second processor corresponding to a second architecture;
    using the single instruction to monitor the resources of the second processor used during emulation at the second processor to determine whether resource requirements of the first processor architecture have been exceeded, wherein the single instruction dynamically generates one or more bit vectors to represent the resources of the second processor architecture;
    if the resource requirements of the first processor architecture have been exceeded, modifying allocation of the resources of the second processor according to the resource requirements of the first processor architecture; and
    if the resource requirements of the first processor architecture have been not exceeded, continuing emulation of the block of code.

2. The method of claim 1, further comprising:
    determining a set of available resources that will be available after the block of code has executed.

3. The of claim 1 wherein the availability of the resources of the second processor is determined at compile time.

4. The method of claim 1 further comprising:
    signaling an error message if the resources of the second processor needed to execute the block of code are not available; and
    in response to the error message, branching to a fault handler routine.

5. The method of claim 4 wherein signaling of the fault handler routine simulates a processor exception.

6. The method of claim 1 wherein dynamically generating the bit vector comprises generating intermediate arrays.

7. The method of claim 6 wherein the intermediate arrays comprise a first array to represent an expected status and a second array to represent a current status.

8. A computer-readable medium having stored thereon a set of instructions to monitor processor resources, said set of instruction, which when executed by a processor, cause said processor to perform a method comprising:
    inserting a single instruction at the block header of a block of code configured for execution on a first processor architecture, wherein the single instruction is to determine if resources needed for the first processor to execute the block of code are available;
    emulating the block of code on a second processor corresponding to a second architecture;
    using the single instruction to monitor the resources of the second processor used during emulation at the second processor to determine whether resource requirements of the first processor architecture have been exceeded, wherein the single instruction dynamically generates one or more bit vectors to represent the resources of the second processor;
    if the resource requirements of the first processor architecture have been exceeded, modifying allocation of the resources of the second processor according to the resource requirements of the first processor architecture; and
    if the resource requirements of the first processor architecture have been not exceeded, continuing emulation of the block of code.

9. The computer-readable medium of claim 8, wherein said set of instructions further includes additional instructions, which when executed by said processor, cause said processor to further perform said method comprising:
    determining a set of available resources that will be available after the block of code has executed.

10. The computer-readable medium of claim 8 wherein the availability of the resources of the second processor is determined at compile time.

11. The computer-readable medium of claim 8 wherein additional instructions, which when executed by the processor, cause the processor to perform the method further comprising:
    signaling an error message if the resources of the second processor needed to execute the block of code are not available; and
    in response to the error message, branching to a fault handler routine.

12. The computer-readable medium of claim 11 wherein signaling of the fault handler routine simulates a processor exception.

13. The computer-readable medium of claim 8 wherein dynamically generating the bit vector comprises generating intermediate arrays.

14. The computer-readable medium of claim 13 wherein the intermediate arrays comprise a first array to represent an expected status and a second array to represent a current status.

* * * * *